(12) United States Patent
Tanaka

(10) Patent No.: US 8,045,095 B2
(45) Date of Patent: Oct. 25, 2011

(54) BACKLIGHT APPARATUS AND DISPLAY APPARATUS USING SAME

(75) Inventor: Mitsuru Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 459 days.

(21) Appl. No.: 12/153,751

(22) Filed: May 23, 2008

(65) Prior Publication Data

US 2008/0297684 A1    Dec. 4, 2008

(30) Foreign Application Priority Data

May 28, 2007  (JP) .................................. 2007-140486

(51) Int. Cl.
*G02F 1/1335*   (2006.01)

(52) U.S. Cl. .......................................... 349/67
(58) Field of Classification Search ...... 349/67
See application file for complete search history.

(56) References Cited

U.S. PATENT DOCUMENTS

| | | | |
|---|---|---|---|
| 5,280,372 A | 1/1994 | Horiuchi | |
| 7,372,520 B2 * | 5/2008 | Mitsuhashi et al. | 349/61 |
| 7,549,768 B2 * | 6/2009 | Sotokawa et al. | 362/218 |
| 2001/0010568 A1 | 8/2001 | Nakano | |
| 2003/0048629 A1 | 3/2003 | Kim et al. | |
| 2005/0122740 A1 | 6/2005 | Cha et al. | |

FOREIGN PATENT DOCUMENTS

| | | |
|---|---|---|
| JP | 11-134921 | 5/1999 |
| JP | 2001-066589 A | 3/2001 |

* cited by examiner

*Primary Examiner* — Phu Vu
(74) *Attorney, Agent, or Firm* — Morgan, Lewis & Bockius LLP

(57) ABSTRACT

A backlight apparatus has a housing composed of a first frame and a second frame, each having a side wall, put together, an optical guide plate housed in the housing, and a reflector inserted between the side surface of the light guide plate and the side wall of the housing. A reflector guide is formed on the side wall of the housing, and has a tilted surface tilted toward an insertion direction of the reflector.

6 Claims, 8 Drawing Sheets

BACKLIGHT APPARATUS AND DISPLAY APPARATUS USING SAME

This application is based on Japanese Patent Application No. 2007-140486 filed on May 28, 2007, the contents of which are hereby incorporated by reference.

BACKGROUND OF THE INVENTION

1. Field of the Invention

The present invention relates to a backlight apparatus, more particularly to a technology which improves ease of insertion and replacement of a reflector including a light source in a backlight apparatus.

2. Description of the Prior Art

In recent years, flat panel displays are becoming the mainstream and expanding their market instead of cathode ray tubes which have been conventionally used as display apparatuses. Among others, liquid crystal displays (LCDs) are characterized by their thinness, light weight, low power consumption, and high definition, and have been widely used in the fields of televisions, personal computers and the like.

An LCD display usually comprises: an LCD module composed of an LCD panel—having a pair of mutually facing electrode boards and liquid crystal sealed therebetween—and a polarizing plate; a backlight apparatus which illuminates the LCD module from the rear surface; and various circuit boards which are used to drive the LCD module.

FIG. 5 is an exploded perspective view of a backlight apparatus 1 of the edge type (hereinafter called as a backlight apparatus 1) before a line light source 7 (not shown in FIG. 5) is built in. The backlight apparatus 1 is so constituted that a reflecting sheet 5, an optical sheet 3 and an light guide plate 4 are housed in a housing 2 which is formed by putting a first frame 2a and a second frame 2b together. Here, the optical sheet 3 is a laminate of a diffusing sheet and a light condensing sheet and is disposed on the upper surface of the light guide plate 4, and the reflecting sheet 5 is disposed on the lower surface of the light guide plate 4.

FIG. 6 is a perspective view of the backlight apparatus 1 before a reflector 6 is built in. As shown in FIG. 6, the backlight apparatus 1 houses the light guide plate 4 and various optical sheets 3 (not shown in FIG. 6). The reflector 6, which retains therein the line light source 7, can be inserted from an inserting opening 8 formed through a side wall of the housing 2. The reflector 6 is disposed in a space between a side surface of the optical guide plate 4 and a side wall of the housing 2, and the line light source 7 is disposed in a position to facing the side surface of the light guide plate 4. Besides, the light guide plate 4 and the reflector 6 are sandwiched vertically between a first frame 2a and a second frame 2b to be retained in position (see FIG. 5).

When the backlight apparatus 1 structured as described above is used in an LCD display apparatus, the light emitted from the line light source 7 enters the light guide plate 4 through a side surface thereof, travels throughout the light guide plate 4 by repeating irregular reflection, reflects off the reflecting sheet 5 disposed on the lower surface of the light guide plate 4 in the upward direction and exits from the light guide plate 4 through the upper surface thereof, passes through the optical sheet 3 and illuminates evenly the LCD panel (not shown in FIG. 6).

On the other hand, when the line light source 7 retained inside the reflector 6 is replaced, the line light source 7 is pulled out via the inserting opening 8 together with the reflector 6, and the line light source 7 is replaced. Thus, the reflector 6 only can be removed without disassembling the backlight apparatus 1. After the line light source 7 is replaced, the reflector 6 is inserted via the inserting opening 8 again, and can be built in the housing 2 by being slid into the space between the side surface of the light guide plate 4 and the side wall of the housing 2.

To curb unevenness in the optical properties of the backlight apparatus 1 and make the entire apparatus small and thin, only the space for housing the reflector 6 needs to be formed between the side surface of the light guide plate 4 and the side wall of the housing 2 to reduce an unnecessary clearance.

FIG. 7 is a perspective view of the reflector retaining the line light source 7 therein. As shown in FIG. 7, an upper plate 6a, a side plate 6b and a lower plate 6c of the reflector are put together to have substantially a C-shaped section, house the line light source 7 therein and retain both ends of the line light source 7 with retaining members 9. Besides, an anode and a cathode are connected to leads 10a and 10b respectively at both ends of the line light source 7. The one lead 10a passes along the rear side of the side plate 6b of the reflector 6 and is bundled with the other lead 10b, and electrically connected to their respective inverters.

FIG. 8 is a perspective view of the backlight apparatus 1 after the reflector 6 is built in. As shown in FIG. 8, when the reflector 6 is inserted into the housing 2, the one lead 10b is pulled through the space between the rear surface of the side plate 6b of the reflector 6 and the side wall of the housing 2, and is drawn out via the inserting opening 8.

However, in this structure, although the reflector 6 housed in the housing 2 is vertically sandwiched and retained between the first frame 2a and the second frame 2b, it is not supported tightly thereby in the direction perpendicular to the inserting direction of the reflector 6, because the space through which the lead 10b passes is formed between the side plate 6b and the side wall of the housing 2. Therefore, there has been a problem that the reflector 6 is not securely fixed in the housing 2 and unevenness in the optical properties is caused. Also there has been a disadvantage that if the space between the side plate 6b of the reflector 6 and the side wall of the housing 2 is made small to make the lead 10b support tightly the side plate 6b of the reflector 6, the lead 10b can be damaged and the efficiency of insertion and replacement of the reflector can be lowered.

Accordingly, conventionally, to solve the problems, in JP-A-H11-134921, for example, a predetermined clearance is formed between the side wall of the housing and the reflector, and a lamp cover is disposed over the rear surface of the side plate of the reflector to protect the lead.

However, according to the invention described in JP-A-H11-134921, because the lamp cover needs to be disposed between the side wall of the housing and the reflector, the backlight apparatus cannot be made compact and the insertion of the reflector cannot be carried out efficiently.

SUMMARY OF THE INVENTION

To cope with the conventional problems mentioned above, it is an object of the present invention to provide a backlight apparatus which allows easy and efficient insertion and replacement of a reflector and which suppresses unevenness in the optical properties of the reflector.

To achieve the above object, according to one aspect of the invention, a backlight apparatus comprises: a housing that is composed of a first frame and a second frame, each having a side wall, combined together and that has a light guide plate housed therein; and a reflector that has a line light source housed therein and that is inserted between the side surface of the light guide plate and the side walls of the housing via an opening formed in the housing. Here, a reflector guide is formed on the side wall of the housing to protrude therefrom, and has a tilted surface tilted toward the insertion direction of the reflector.

In the backlight apparatus described above, a plurality of said reflector guides may be formed on the side wall of said housing.

According to another aspect of the invention, a display apparatus comprises: the backlight apparatus described above; and a light control member fro controlling the light emitted from the line light source.

In the display apparatus described above, the light control member may be a liquid crystal panel.

With the first structure according to the present invention, because the reflector guide having a tilted surface tilted toward the inserting direction of the reflector is formed on the side wall of the housing, an end portion of the reflector slides along the tilted surface and is guided into the housing. Thus the reflector is easily inserted into the housing and the reflector replacing efficiency is improved.

Further, after the reflector is inserted, because the reflector is supported tightly by the reflector guide in the direction perpendicular to the inserting direction, the reflector is securely retained in the housing, and unevenness in the optical properties can be suppressed.

In addition, when the reflector guide is formed lower than the side wall of the housing, a space through which the lead can pass is ensured between the upper surface of the reflector and the upper surface of the housing. Thus when the reflector is built in, the lead is not sandwiched nor damaged between the side wall of the housing and the side surface of the reflector. Moreover, the reflector guide is designed as small as possible taking into account the thickness of the lead, which allows the backlight apparatus to be compact.

With the second structure according to the present invention, a plurality of reflector guides formed on the side wall of the housing securely retain the reflector in the housing, and unevenness of the optical properties can be curbed.

With the third structure according to the present invention, a display apparatus equipped with the backlight apparatus having the above-mentioned features can be provided.

With the fourth structure according to the invention, a liquid crystal display apparatus equipped with the backlight apparatus having the above-mentioned features can be provided.

DETAILED DESCRIPTION OF PREFERRED EMBODIMENTS

Figure 1:
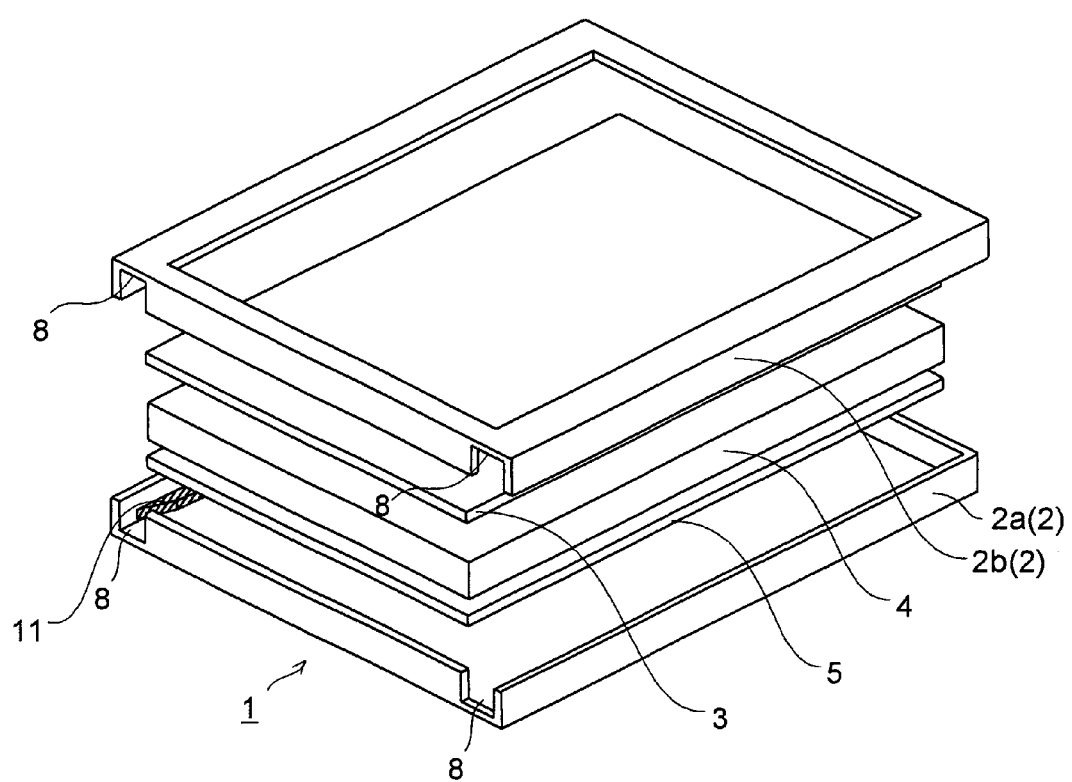
FIG. 1 is an exploded perspective view of a backlight apparatus according to the present invention.

Hereinafter, an embodiment of the present invention will be explained referring to the drawings. The portions which are the same as or similar to those in FIGS. 5-8 showing the conventional apparatus are numbered with the same numerals and the description of them is omitted. In these drawings, for easy understanding, the dimensional ratios of the members are different from the actual ones and the structure is schematically shown with details omitted.

FIG. 1 is an exploded perspective view showing a state before the reflector 6 is built in a backlight apparatus according to an embodiment of the present invention. Like the conventional apparatus shown in FIG. 5, the backlight apparatus according to the embodiment of the present invention has the structure in which the optical sheet 3 is laminated on the upper surface of the light guide plate 4 and the reflecting sheet 5 is laminated on the lower surface of the light guide plate 4. The reflector 6 (not shown in FIG. 1) retaining the line light source 7 is disposed at the side surface of the light guide plate 4. These components are housed in the housing 2 which is formed by putting together the first frame 2a and the second frame 2b. As two inserting openings 8, openings are formed in a side wall of the first frame 2a and the second frame 2b. The reflectors 6 (not shown in FIG. 1) are inserted in or pulled out via the inserting openings 8 to replace the line light sources 7. A reflector guide 11 which guides the insertion of the reflector 6 is disposed on the inner surface of a side wall of the first frame 2a.

The light guide plate 4 changes the optical path of the light which is emitted from the line light source 7 and which enters the light guide plate 4 from the side surface of the light guide plate 4 and converts the light into light which has an optical distribution of light emitted from a surface light source. The light guide plate 4 is a wedge-type plate or a parallel-plate type plate molded of polycarbonate or acryl resin.

In the line light source 7 according to the embodiment, cold-cathode tubes are used. However, instead of them, hot-cathode tubes, or xenon tubes as discharge tubes, may be used.

The reflecting sheet 5 is a flexible sheet of white resin, either alone or having silver, aluminum, or the like vapor-deposited thereon as a reflective layer having high reflectance. The reflecting sheet 5 efficiently reflects the light from the light guide plate 4 toward an LCD panel.

The optical sheet 3 is a laminate of a diffusing sheet and a plurality of light condensing sheets. Fine concaves and convexes are formed on one side of the diffusing sheet and irregularly reflect the light from the light guide plate 4. The upper surface of the light condensing sheet is a prism surface which improves the brightness toward the LCD panel.

Figure 2:
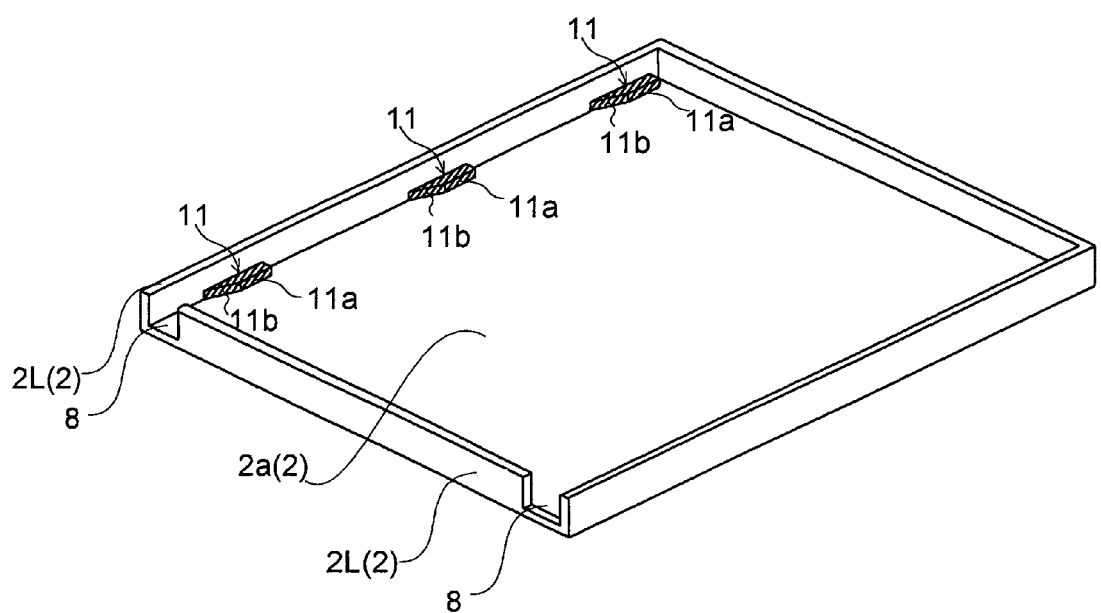
FIG. 2 is a perspective view of a first frame according to the present invention.

FIG. 2 is a perspective view of the first frame 2a according to the embodiment. The first frame 2a has side walls 2L which form a housing space and are partially cut out to form the inserting openings 8 through which the reflectors 6 are inserted. The first frame 2a is made of resin, and a plurality of reflector guides 11 made of resin are formed on the inner surface of the side wall 2L. The reflector guides 11 have a parallel surface 11a parallel to the side wall 2L of the first frame 2a and a tilted surface 11b which is tilted toward the inserting direction, and are formed lower than the side walls 2L. The reflector guides 11 and the first frame 2a are unitarily made of resin.

Figure 3A:
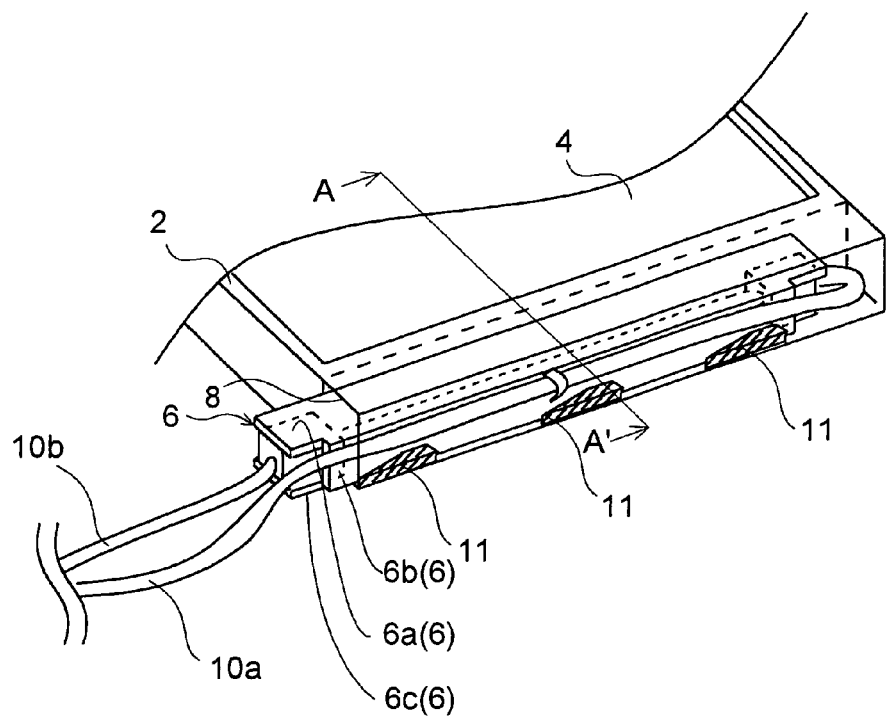
FIG. 3A is a perspective view showing the backlight apparatus according to the present invention in its state with a reflector inserted therein.
Figure 3B:
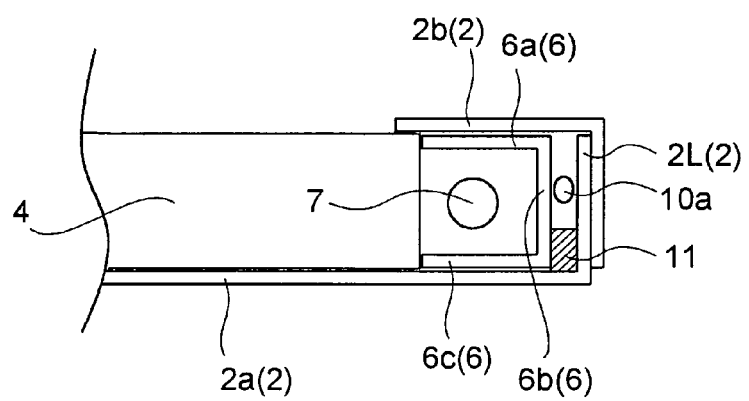
FIG. 3B is a sectional view taken along A-A' of FIG. 3A.

FIG. 3A is a perspective view of the backlight apparatus 1 showing how the reflector 6 is inserted into the backlight apparatus 1 according to the embodiment. FIG. 3b is a sectional view taken along A-A' in FIG. 3A. As shown in FIG. 3A, in the backlight apparatus 1 according to the embodiment, the reflector 6 can be slidably inserted and incorporated in the space between the side wall of the light guide plate 4 and the side wall of the housing 2 via the inserting opening 8 formed through the side wall of the housing 2. Inversely, the reflector 6 can be drawn out and removed via the inserting opening 8. When the reflector 6 is inserted, the tip end of the side plate 6b of the reflector 6 is guided by the tilted surface 11b of the reflector guide 11 and inserted. After the insertion, the side plate 6b contacts the parallel surface 11a of the reflector guide 11 (see FIG. 2). Thus the tip end of the side plate 6b is not obstructed by the reflector guide 11 and the reflector 6 can be smoothly inserted. The parallel surface 11a supports tightly the reflector 6, and the reflector 6 is securely retained in the housing 2 even if the reflector 6 is vibrated in the direction perpendicular to the inserting direction.

As shown in FIG. 3B, the reflector guide 11 is made lower than the side wall 2L of the housing 2, which ensures the space for the lead 10a between the side plate 6b of the reflector 6 and the side wall 2L of the housing 2. Accordingly, when inserting the reflector 6, the lead 10a passing along the rear surface of the side plate 6b is prevented from rubbing against the side plate 6b or the side wall 2L and being damaged. And the lead 10a inserted in the housing 2 is pulled through the space between the side plate 6b of the reflector 6 and the side wall 2L of the housing 2 and drawn out via the inserting opening 8.

Figure 4:
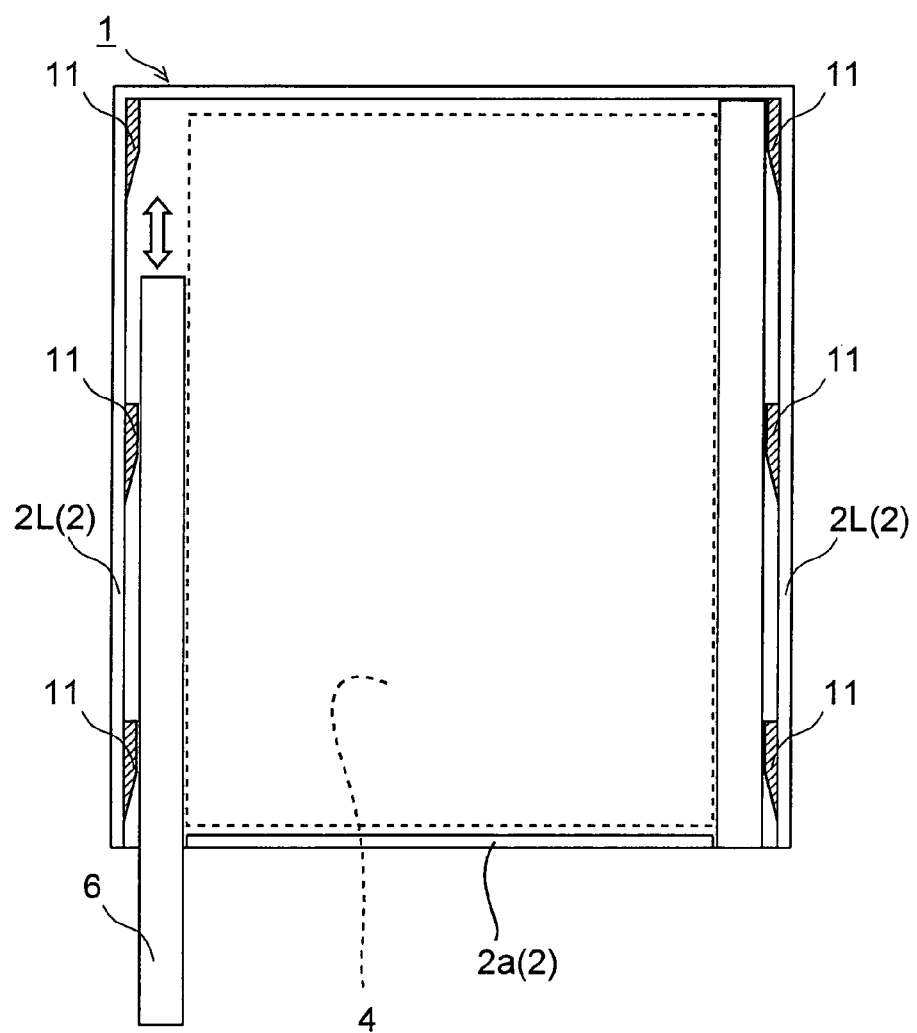
FIG. 4 is a front view of the backlight apparatus according to the present invention.
Figure 5:
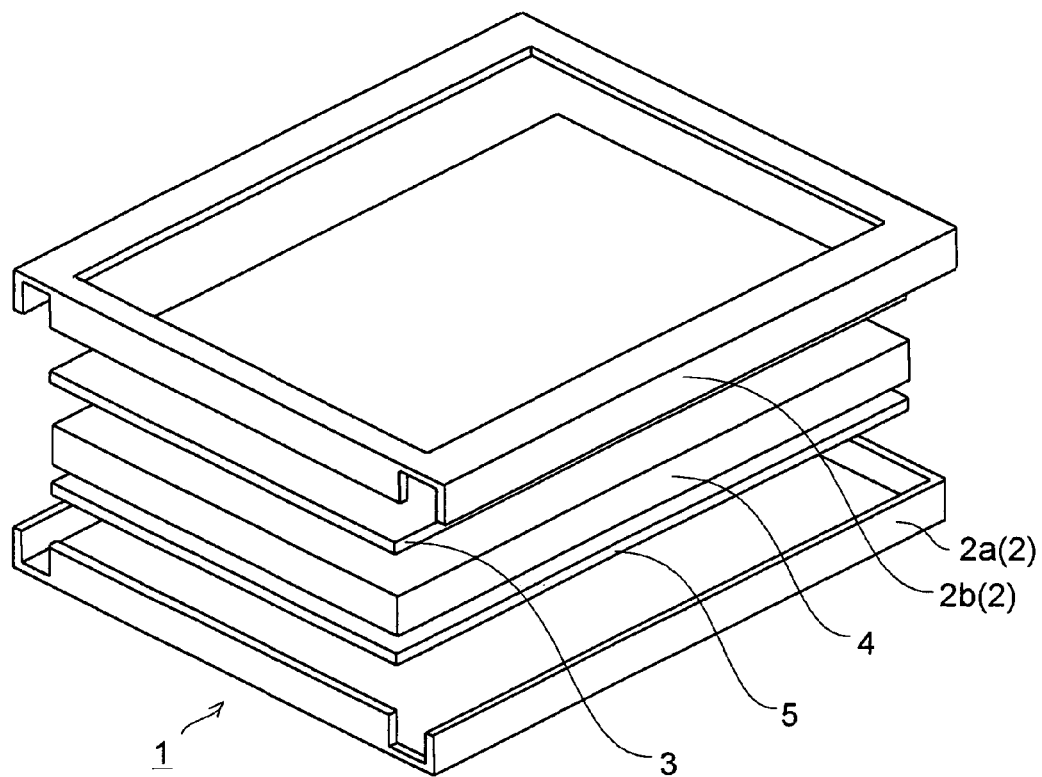
FIG. 5 is an exploded perspective view of a conventional backlight apparatus.
Figure 6:
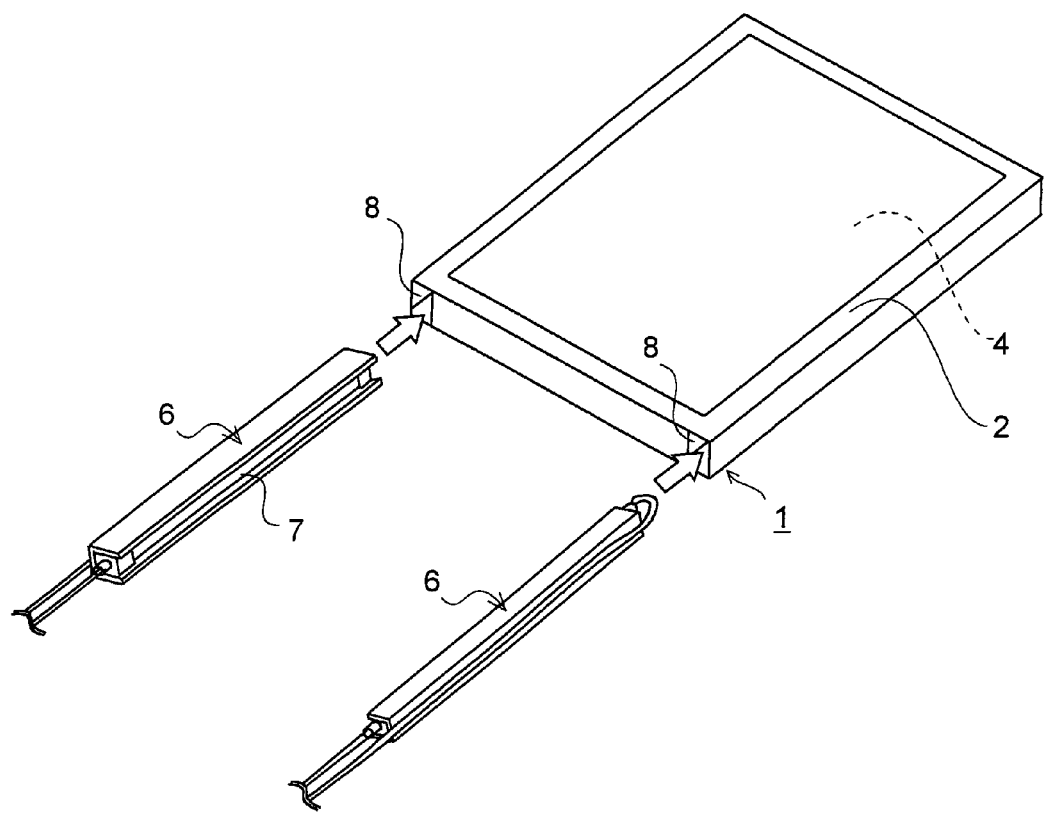
FIG. 6 is a perspective view showing how a reflector is inserted in the conventional backlight apparatus.
Figure 7:
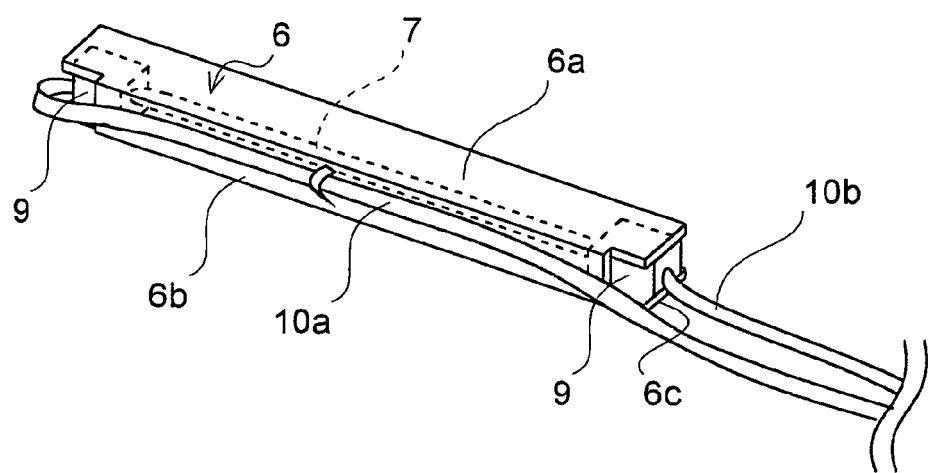
FIG. 7 is a perspective view of a reflector that is inserted in the conventional backlight apparatus.
Figure 8:
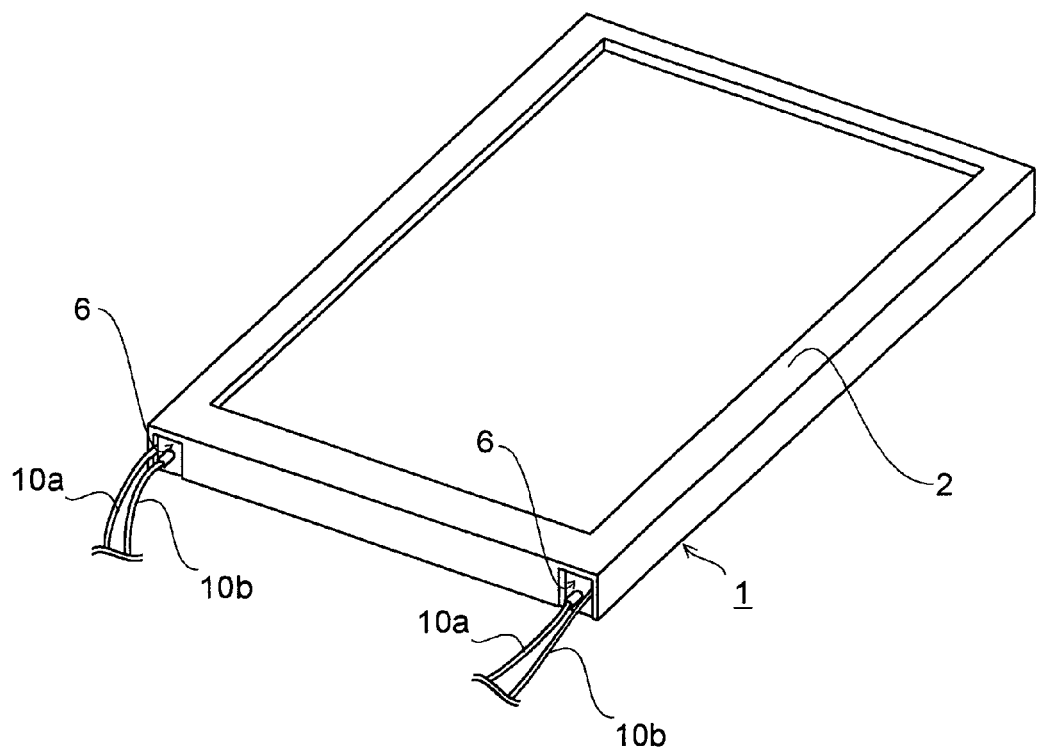
FIG. 8 is a perspective view showing a state in which a reflector is inserted in the conventional backlight apparatus.

FIG. 4 is a plan view of the backlight apparatus 1 according to the embodiment of the invention. As shown in FIG. 4, the backlight apparatus 1 according to the embodiment is a type of apparatus in which the reflectors 6 are disposed at both opposite side surfaces of the light guide plate 4. Accordingly, the reflector guides 11 are also respectively formed at opposite side walls 2L of the housing 2 and allow the easy insertion and remove of each reflector 6. In the embodiment, three reflector guides 11 are substantially equally spaced on the side walls 2L of the housing 2. However, this is not meant to limit the scope of the present invention; that is, only one reflector guide 11 also can bring the same effect of the present invention. Besides, it is possible to form a plurality of reflector guides 11 and securely retain them. The reflector guides 11 may be unitarily formed with the first frame 2a or separate members may be fixed to the side walls 2L. When separate members are fixed to the side walls 2L, the reflector guides 11 may be made of an elastically deformable material to enhance the pushing function.

Further, the present invention is not limited to the structure in which the reflectors 6 are disposed at both side surfaces of the light guide plate 4. In other words, the reflector 6 may be disposed at one side surface of the light guide plate 4 and used for the type of backlight apparatus in which light is shone from one direction.

What is claimed is:

1. A backlight apparatus comprising:
   a housing composed of a first frame and a second frame, each having a side wall, put together, the housing having a light guide plate housed therein; and
   a reflector having a line light source housed therein and inserted between a side surface of said light guide plate and the side wall of said housing via an opening formed in said housing;
   wherein a reflector guide is formed on the side wall of said housing to protrude therefrom, said reflector guide having a tilted surface tilted toward an insertion direction of said reflector.

2. The backlight apparatus according to claim 1, wherein a plurality of said reflector guides are formed on the side wall of said housing.

3. A display apparatus comprising:
   the backlight apparatus according to claim 1 or 2; and
   a light control member for controlling light emitted from said line light source.

4. The display apparatus according to claim 3, wherein said light control member is a liquid crystal panel.

5. The backlight apparatus according to claim 1, wherein the reflector is guided by the tiled surface of the reflector guide when inserting to a space between the surface of the light guide plate and the side wall of the housing.

6. The backlight apparatus according to claim 1, wherein the reflector guide further comprises a parallel surface parallel to the side wall of the housing, wherein
   the parallel surface of the reflector guide is configured to contact the reflector after the insertion, and tightly support the reflector.

* * * * *